United States Patent [19]

Nomura

[11] Patent Number: 5,225,938
[45] Date of Patent: * Jul. 6, 1993

[54] GUIDE APPARATUS OF CAM RING

[75] Inventor: Hiroshi Nomura, Tokyo, Japan

[73] Assignee: Asahi Kogaku Kogyo Kabushiki Kaisha, Tokyo, Japan

[*] Notice: The portion of the term of this patent subsequent to May 11, 2010 has been disclaimed.

[21] Appl. No.: 628,159

[22] Filed: Dec. 17, 1990

[30] Foreign Application Priority Data

May 29, 1990 [JP] Japan ................. 2-56187[U]

[51] Int. Cl.$^5$ .................. G02B 15/14; G02B 7/02
[52] U.S. Cl. .................... 359/699; 359/703; 359/823
[58] Field of Search ............ 359/699–706, 359/811–830, 808, 740; 354/195.1–195.12, 286

[56] References Cited

U.S. PATENT DOCUMENTS

| | | | |
|---|---|---|---|
| 3,841,735 | 10/1974 | Katagin et al. | 359/206 |
| 3,906,529 | 9/1975 | Filipourch | 359/201 |
| 3,931,629 | 1/1976 | Himmelsbach | 354/195.1 |
| 4,099,847 | 7/1978 | Ito | 359/705 |
| 4,322,150 | 3/1982 | Kamata et al. | 354/195.12 |
| 4,380,378 | 4/1983 | Tamura | 359/699 |
| 4,384,767 | 5/1983 | Kawai | 359/823 |
| 4,484,800 | 11/1984 | Tamura | 359/822 |
| 4,544,240 | 10/1985 | Shimizu | 359/207 |
| 4,707,083 | 11/1987 | Iizuka et al. | 359/823 |
| 4,759,618 | 7/1988 | Kamata | 359/703 |
| 4,767,200 | 8/1988 | Inaba et al. | 359/823 |
| 4,934,789 | 6/1990 | Lemke | 359/823 |

FOREIGN PATENT DOCUMENTS

| | | | |
|---|---|---|---|
| 2846241 | 5/1980 | Fed. Rep. of Germany | 359/819 |
| 62-112109 | 5/1987 | Japan | |
| 112110 | 5/1987 | Japan | |
| 1433284 | 4/1976 | United Kingdom | |
| 8807694 | 10/1988 | World Int. Prop. O. | |

Primary Examiner—Bruce Y. Arnold
Assistant Examiner—Thong Nguyen
Attorney, Agent, or Firm—Sandler Greenblum & Bernstein

[57] ABSTRACT

A guide apparatus is provided for a rotatable cam ring which has inner cam grooves in which cam pins, which are provided on a movable member and are biased to project in the radial direction of the cam ring, are fitted. The movable member is provided with cam pin supporting holes in which the cam pins are radially movably held and leaf spring holding portions corresponding to the cam pin supporting holes. The apparatus includes leaf springs which are engaged at one end by the leaf spring holding portions and which are provided with cam pin holding portions in which cam pins fitted in the cam pin supporting holes are held. The leaf spring are elastic, so that when the leaf springs are engaged at one end by the leaf spring holding portions, the leaf springs are elastically deflected at their other ends in a radial outward direction.

15 Claims, 3 Drawing Sheets

GUIDE APPARATUS OF CAM RING

BACKGROUND OF THE INVENTION

1. Field of the Invention

The present invention relates to a guide apparatus for a cam ring which has an inner cam groove in which a cam pin of a movable member is fitted, so that when the cam ring rotates, the movable member is moved in a predetermined direction.

This application is related to commonly assigned application U.S. Ser. No. 07/616,260, the disclosure of which is expressly incorporated by reference herein.

2. Description of the Related Art

A cam ring guide apparatus as mentioned above is widely used, for example, as a lens guide apparatus in a zoom lens. Namely, a lens holding frame which holds a lens group has a cam pin which is fitted in a cam groove of a cam ring, so that the rotation of the cam ring causes the lens holding frame to move in the optical axis direction thereof. In a recent cam ring guide apparatus, the cam groove is formed as an inner cam groove which has a bottom wall. A cam pin is continuously biased to outwardly project from the lens holding frame in the radial direction, so as to ensure the engagement of the cam pin and the inner cam groove.

In a known cam ring guide apparatus, in order to bias the cam pin outwardly, a compression spring is provided in a cam pin supporting hole in which the cam pin is inserted. Upon assembly, after the compression spring is inserted in the cam pin supporting hole, the cam pin is pushed into the cam pin supporting hole while compressing the compression spring. Then, the lens group is fitted in the cam ring while registering the cam pin with the inner cam groove. However, these operations are troublesome and require high skill by camera manufacturing. Accordingly, for example, a beginner tends to fail to fit the cam pin in the inner cam groove, so that the cam pin comes out or is ejected from the cam pin supporting hole by the compression spring, resulting in the loss thereof.

SUMMARY OF THE INVENTION

The primary object of the present invention is, thus, to provide a simple cam ring guide apparatus which can be easily assembled.

The improvement of the present invention is focused on a single leaf spring which supports and biases a cam pin.

To achieve the object mentioned above, according to the present invention, there is provided a guide apparatus for a rotatable cam ring which has at least one inner cam groove in which at least one cam pin which is provided on a movable member, and which is biased to project in the radial direction of the cam ring is fitted. The movable member is provided with at least one cam pin supporting hole in which the cam pin is radially movably held. The movable member also includes a leaf spring holding portion corresponding to the cam pin supporting hole, with the apparatus comprising at least one leaf spring which is engaged at one end by the leaf spring holding portion, and which is provided with a cam pin holding portion in which the cam pin fitted in the cam pin supporting hole is held. The leaf spring is elastic, so that when the leaf spring is engaged at one end by the leaf spring holding portion, the leaf spring is elastically deflected at the other end thereof in a radial and outward direction.

With this arrangement, since the cam pin can be easily supported by the lens holding frame so as not to come out therefrom and can be biased to project outwardly in the radial direction, the assembly can be simplified. This makes automatic assembly possible.

The present disclosure relates to subject matter contained in Japanese Utility Model Application No. 2-56187 (filed on May 29, 1990) which is expressly incorporated herein by reference in its entirety.

BRIEF DESCRIPTION OF THE DRAWINGS

The present invention will be described below in detail with reference to the accompanying drawings, in which.

DESCRIPTION OF THE PREFERRED EMBODIMENTS

Figure 1:
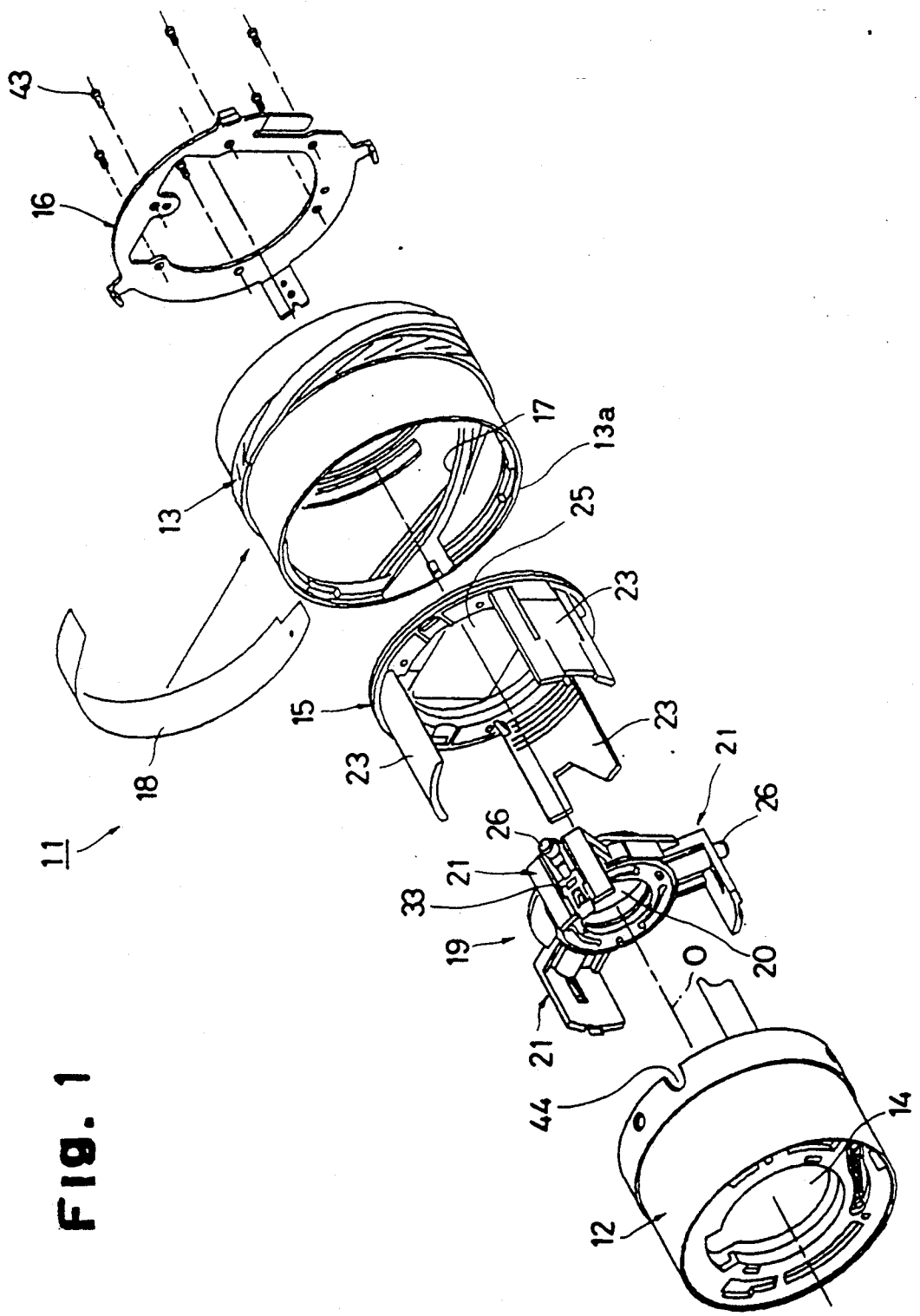
FIG. 1 is an exploded perspective view of the lens portion of a lens guide apparatus to which the present invention is applied.

FIG. 1 shows an exploded perspective view of the lens portion of the lens guide apparatus, according to an embodiment of the present invention. In FIG. 1, "O" designates the optical axis and the left side of the drawing corresponds to the front of the apparatus.

The lens portion 11 attached to a camera has a lens barrel 12 and a cam ring 13. A linear movement guide ring 15 is inserted in the cam ring 13 and is secured by set screws 43 to a guide ring securing plate 16 which is attached thereto from the rear side of the cam ring 13. Thus, the linear movement guide ring 15 is secured to the camera body (not shown). The cam ring 13 is provided on its outer periphery with a code plate 18 secured thereto to output data relating to the angular position of the cam ring 13. The cam ring 13 is provided on its inner peripheral surface with inner cam grooves 17 which open, at at least one end, at the front end 13a of the cam ring 13.

Figure 2:
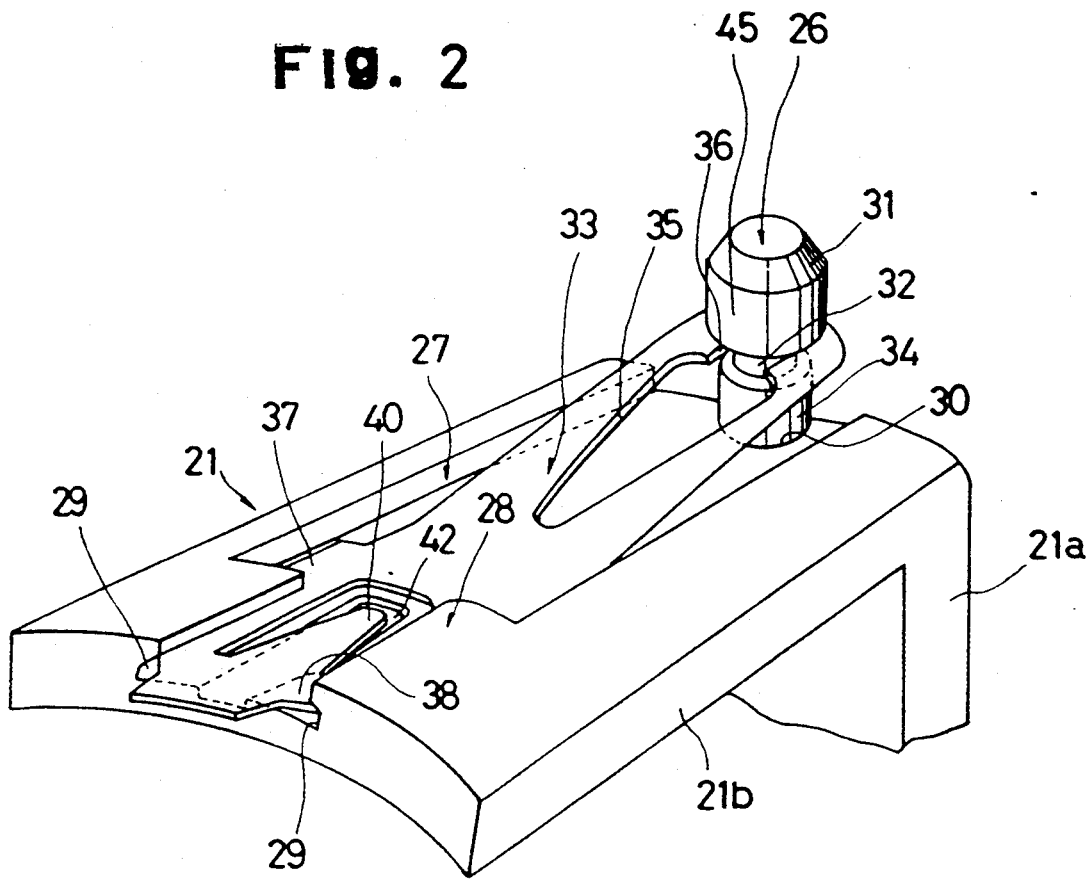
FIG. 2 is an enlarged perspective view of a cam pin supporting mechanism of a rear lens frame in the lens portion shown in FIG. 1.

A rear lens frame 19 which is inserted in the cam ring 13 has a lens 20 at its center portion. The rear lens frame 19 constitutes a movable member which moves in the optical axis direction O when the cam ring 13 rotates. The rear lens frame 19 has three cam pin supporting legs 21, each of which has a leg portion 21a which projects in the radial direction of the lens 20 from the rear lens frame 19, and an arched plate portion 21b which is bent at right angle from the leg portion 21a to extend in a direction substantially parallel with the optical axis O (FIG. 2). The three plate portions 21a are located along an imaginary circle to define an imaginary cylinder.

The linear movement guide ring 15 has a center opening 25 and three arched key plates 23 around the center opening 25. The three key plates 23 which extend in a direction parallel with the optical axis O are located along an imaginary circle to define an imaginary cylinder.

Figure 3:
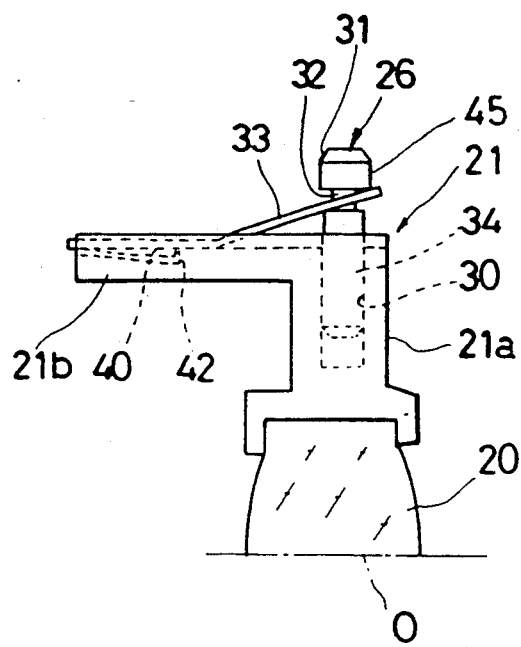
FIG. 3 is a side view of FIG. 2.

As can be seen in FIGS. 2 and 3, the plate portions 21b of the cam pin supporting legs 21 have leaf spring receiving grooves (recesses) 27 which extend in a direction substantially parallel with the optical axis O and which are provided on their front ends with leaf spring holding portions 28 having a width smaller than that of the leaf spring receiving grooves 27. The holding portions 28 have side dovetail grooves 29 at the opposite sides thereof. The leaf spring receiving grooves 27 are provided at their rear ends with cam pin supporting holes 30 which extend in the radial direction of the lens 20. Cam pins 26 which are fitted in the cam pin supporting holes 30 have smaller diameter shaft portions 34 which are slidably inserted in the cam pin supporting holes 30, peripheral recesses 32 having a diameter smaller than the diameter of the shaft portions 34, and upper head portions (large diameter portions) 45 which have a diameter larger than that of the shaft portions 34. The head portions 45 are provided on their upper ends with tapered conical peripheral surfaces 31.

In the leaf spring receiving grooves 27 are inserted leaf springs 33 which are deflected or bent upwardly at the rear ends or front ends thereof, when in their free state. The leaf springs 33 have, at their front ends, engaging portions 38 which are fitted in the side dovetail grooves 29 to be engaged thereby and abutting portions 37 which are connected to the engaging portions 38 and which abut against the rear ends of the leaf spring abutting portions 28 to restrict the forward movement of the associated leaf springs 33. The abutting portions 37 have a width larger than that of the leaf spring abutting portions 28. The engaging portions 38 have engaging fingers 40 at the center portions to prevent the leaf springs 33 from coming out of the leaf sprig receiving grooves 27. The engaging fingers 40 are bent slightly inwardly from the remaining flat portion of the abutting portions 37, so that the engaging fingers 40 can be engaged in corresponding engaging recesses 42 which are formed in the leaf spring receiving grooves 27.

Each of the leaf springs 33 is provided on its opposite end with a cam pin receiving elongated opening 35 having a width which gradually increases toward the rear end thereof. The elongated opening 35 is provided on its rear end with a cam pin holding portion (hole) 36 which has a reduced width, so that the peripheral groove 32 of the associated cam pin 26 can be firmly held in the cam pin holding hole 36. The outer diameter of the head 45 of the cam pin 26 is larger than the largest width of the elongated opening 35, so that when the shaft portion 34 of the cam pin 26 is inserted in the elongated opening 35, the head 45 can not pass the elongated opening 35.

In the lens guide apparatus as constructed above, the attachment of the three cam pins 26 to the associated three cam pin supporting legs 21 is effected as follows.

First, the shaft portions 34 of the cam pins 26 are inserted in the cam pin receiving elongated openings 35 of the leaf springs 33. In this state, the leaf springs 33 are free from the associated cam pins 26. Then, the shaft portions 34 of the cam pins 26 are moved to move into the cam pin supporting holes 30, so that the cam pins 26 are prevented from coming out of the associated leaf springs 33 by the heads (larger diameter portions) 45 thereof.

After that, the engaging portions 38 of the leaf springs 33 are fitted in the side dovetail grooves 29 until the abutting portions 37 come into contact with the rear ends of the leaf spring holding portions 28. During the fitting, the engaging fingers 40 which slide on the surfaces of the leaf spring receiving grooves 27 are engaged in the corresponding engaging recesses 42 of the leaf spring receiving grooves 27. As a result, the leaf springs 33 are held in the leaf spring receiving grooves 27 so as not to come out therefrom. At the same time, on the rear end sides of the leaf springs 33, since the cam pin receiving elongated openings 35 of the leaf springs 33 are moved along the lower surfaces of the heads 45 of the cam pins 26 in the optical axis direction, the cam pin holding holes 36 finally come into engagement with the peripheral grooves 32 of the cam pins 26. As a result, the cam pins 26 are held by the leaf springs 33 so as not to be disengaged therefrom and are biased outwardly in the radial direction of the rear lens frame 19 by the associated leaf springs 33. The above mentioned operations are performed for each of the three cam pins 26.

Thereafter, the cam pins 26 are engaged in three corresponding engaging recesses 44 which are formed on the rear end of the lens barrel 12. After that, the three cam pin supporting legs 21 of the rear lens frame 19 are inserted between the key plates 23 of the linear movement guide ring 15, and then, the lens barrel 12 is fitted in the cam ring 13 together with the rear lens frame 19 and the linear movement guide ring 15, which is placed between the lens barrel 12 and the cam ring 13.

Figure 4:
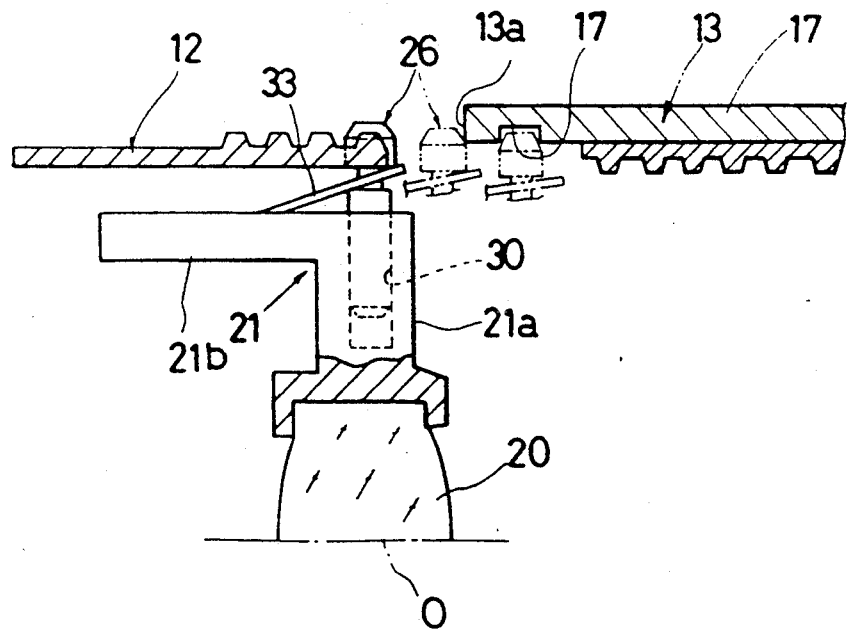
FIG. 4 is a side sectional view of a cam pin when a rear lens frame is fitted in a cam ring, according to the present invention.

Upon fitting the lens barrel 12 in the cam ring 13, the cam pins 26 are smoothly engaged in the inner cam grooves 17 which open into the front end 13a of the cam ring 13, while sliding the tapered surface 31 of the cam pins 26 along the side surfaces of the associated inner cam grooves 17, as can be seen in FIG. 4. Note that the three cam pins 26 are engaged in the corresponding inner cam grooves 17 at one time. Thereafter, the linear movement guide ring 15 is secured to the camera body through the guide ring securing plate 16.

Thus, the cam pins 26 can be easily assembled to be engaged in the associated inner cam grooves 17 and prevented from coming out of the associated cam pin supporting holes without a special tool or jig for pressing the cam pins. The simplified assembly even makes automatic assembly possible.

Although the above mentioned embodiment is directed to a lens guide apparatus for guiding the rear lens frame 19, the present invention is not limited thereto and can be generically applied to a guide apparatus for guiding an annular member, such as a light intercepting ring.

I claim:

1. A guide apparatus of a rotatable cam ring which has at least one inner cam groove in which at least one cam pin which is provided on a movable member and is biased to project in a radial direction of the cam ring is fitted, wherein said movable member is provided with at least one cam pin supporting hole in which said cap pin is adapted to be radially movably held, and a leaf spring holding portion spaced from said cam pin supporting hole, and wherein said guide apparatus comprises at least one leaf spring which is engaged at one end by said leaf spring holding portion and which is provided with a cam pin holding portion in which said cam pin fitted in said cam pin supporting hole is held; and said leaf spring is elastic, so that when said leaf spring is engaged at one end by said leaf spring holding portion, said leaf spring is elastically deflected at another end in a radial and outward direction.

2. A cam ring guide apparatus according to claim 1, wherein said movable member is a lens holding frame for holding a lens group.

3. A cam ring guide apparatus according to claim 2, wherein said leaf spring has a cam pin receiving elongated opening connected to said cam pin holding portion.

4. A cam ring guide apparatus according to claim 3, wherein said cam pin has a shaft portion which is adapted to be fitted in said supporting hole, a peripheral groove which has a diameter smaller than that of the shaft portion and which can be held by said cam pin holding portion, and a larger diameter portion which can not pass through said cam pin receiving elongated opening.

5. A cam ring guide apparatus according to claim 4, wherein said cam pin holding portion is engaged by said cam pin when said leaf spring is moved relative to said leaf spring holding portion.

6. A cam ring guide apparatus according to claim 5, wherein said leaf spring has, at one end, an engaging portion which engages said leaf spring holding portion, and an abutting portion, which abuts against a rear end of said leaf spring holding portion to restrict movement of said leaf spring.

7. A cam ring guide apparatus according to claim 1, wherein said inner cam groove opens at at least one end of said groove into the end of the cam ring, so that said cam pin which is held by said movable member through said leaf spring can be fitted in said inner cam groove from the open end.

8. A cam ring guide apparatus according to claim 7, wherein said cam pin has a larger diameter portion which can not pass through said cam pin holding portion.

9. A cam ring guide apparatus according to claim 8, wherein said larger diameter portion of said cam pin has a tapered top peripheral surface which can be brought into sliding contact with said inner cam groove when said cam pin is inserted into said inner cam groove.

10. A cam ring guide apparatus according to claim 1, wherein said movable member has a plurality of cam pin supporting legs which project outwardly and radially so as to be held by the inner surface of the cam ring, each of said supporting legs including said cam pin supporting hole and said leaf spring holding portion.

11. A cam ring guide apparatus according to claim 10, wherein said cam pin supporting legs have leg portions which project in radial directions of said cam ring, and plate portions which are bent substantially at right angles from the associated leg portions to extend in a direction substantially transverse to the radial directions of said cam ring and which can be slid within said cam ring.

12. A cam ring guide apparatus according to claim 11, wherein said leaf spring holding portions are provided with dovetail grooves which are located at the front ends of the plate portions of said cam pin supporting legs and extend in a direction parallel with the optical axis, so that one end of said leaf springs can be fitted in the dovetail grooves of the associated leaf spring holding portions to be held thereby.

13. A cam ring guide apparatus according to claim 12, wherein said leaf springs have engaging fingers and wherein said leaf spring holding portions have engaging recesses in which the associated engaging fingers can be engaged to prevent said leaf springs from coming out of the associated leaf spring holding portions.

14. A cam ring guide apparatus comprising:
a rotatable cam ring having inner cam grooves and defining an axis of rotation;
a lens holding frame having cam pins which are fitted in the inner cam grooves of said rotatable cam ring; and
leaf springs, wherein said leaf springs each comprises a length dimension, each said length dimension being the largest dimension of each said spring, wherein each said length dimension of each said spring is elongated along a direction of the axis of rotation and engaged at one end to said lens holding frame and are engaged at another end to said cam pins in order to bias said cam pins in a radial direction so that said cam pins elastically fit into said inner cam grooves.

15. A cam ring guide apparatus according to claim 14, wherein said leaf springs are engaged radially external of said lens holding frame and radially internal of said cam ring.

* * * * *

UNITED STATES PATENT AND TRADEMARK OFFICE
CERTIFICATE OF CORRECTION

PATENT NO. : 5,225,938
DATED : July 6, 1993
INVENTOR(S) : H. NOMURA

It is certified that error appears in the above-indentified patent and that said Letters Patent is hereby corrected as shown below:

At column 4, line 54 (claim 1, line 6) of the printed patent, change "cap" to ---cam---.

Signed and Sealed this

Twenty-sixth Day of July, 1994

Attest:

BRUCE LEHMAN

*Attesting Officer*     *Commissioner of Patents and Trademarks*